Oct. 9, 1928.
O. E. HORNER
1,687,021
CONVERTIBLE AUTOMOBILE BODY
Filed May 25, 1925
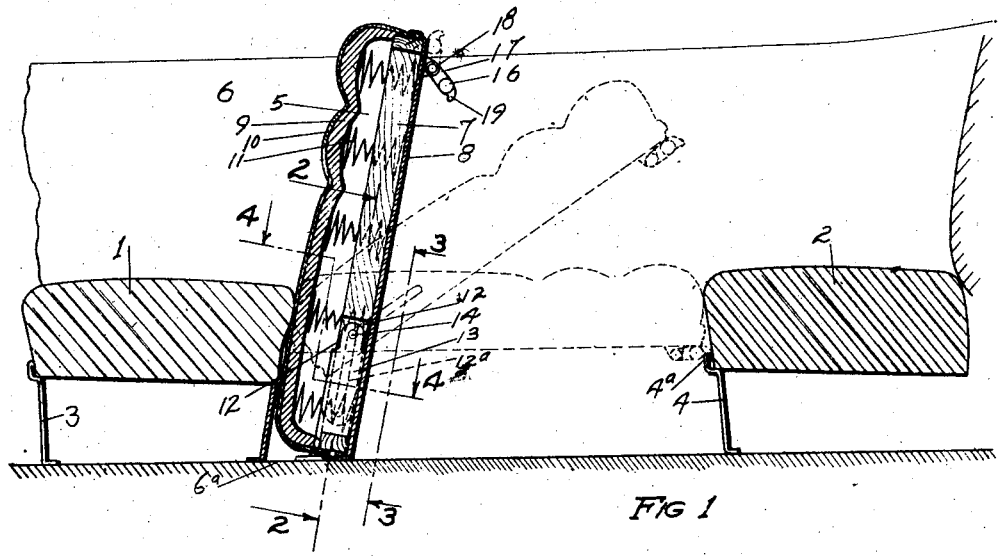
Fig 1
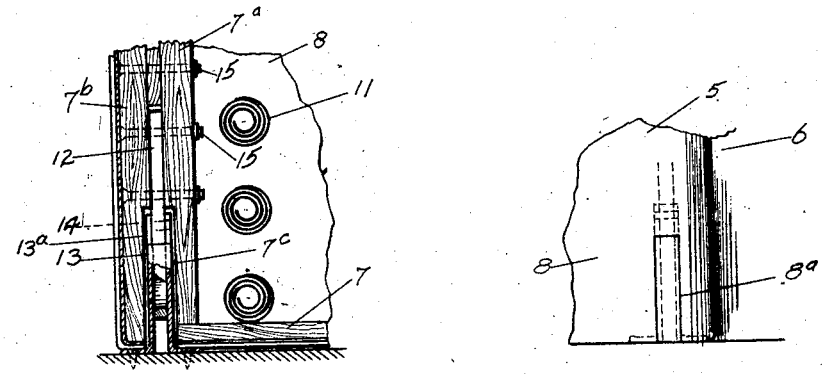
Fig 2
Fig 3
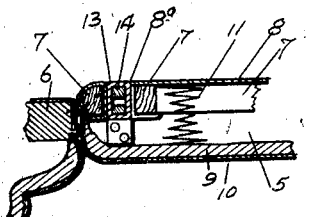
Fig. 4
Inventor
OLIVER E. HORNER.
By A. B. Bowman
Attorney Patented Oct. 9, 1928.

1,687,021

UNITED STATES PATENT OFFICE.

OLIVER E. HORNER, OF SAN DIEGO, CALIFORNIA.

CONVERTIBLE AUTOMOBILE BODY.

Application filed May 25, 1925. Serial No. 32,629.

My invention relates to a convertible automobile body, and the objects of my invention are: first, to provide a structure of this class whereby the interior of an automobile body provided with seats may be readily and easily converted into a comfortable bed of the full width of the interior of the automobile body; second, to provide a back for the front seat of an automobile which is upholstered at its front side and of such a height from its lower to its upper end as to span and be supported in the space between the rear side of the front seat and the front side of the rear seat of the automobile, a portion of the back extending above the front seat and a portion thereof extending below the same, the normally front side of said back or the outer side of the upholstering thereof being substantially flush with the upper upholstered sides of the conventional front and rear seats of the automobile; third, to provide a simple, economical and rigid hinge means for a tiltable back member of automobile seats in which the back member may be rigidly supported in an upright position or rigidly supported at its front portion when folded downwardly to a horizontal position; fourth, to provide novel means in connection with the conventional robe rail usually mounted at the upper portion of the back member of the front seat of automobiles for supporting the upper portion of the back member in front of the back seat of the automobile; fifth, to provide as a whole a novelly constructed convertible automobile body for converting the seats thereof into beds, and sixth, to provide a structure of this class which is simple and economical of construction, durable, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a longitudinal sectional elevational view taken through the interior of the body of an automobile, illustrating my invention in connection with the back of the front seat thereof, showing by dotted lines certain shifted positions of the back member; Fig. 2 is a fragmentary sectional elevational view, taken through 2—2 of Fig. 1, showing the hinge construction at one end of the back member; Fig. 3 is a fragmentary elevational view thereof, taken at 3—3 of Fig. 1, and Fig. 4 is a fragmentary sectional view thereof in plan, taken through 4—4 of Fig. 1.

Like characters of reference refer to similar parts and portions throughout the several views of the drawings.

The front and rear seat members 1 and 2 are of the conventional upholstered construction and are mounted respectively on supporting frames 3 and 4, as in the conventional automobile now in use, the supporting frames or members 3 and 4 forming part of the automobile body 6. In place of the conventional back member, which is usually supported on the conventional seat supporting frame 3 and built into the side walls of the vehicle body 6 behind the front seat of the automobile, I have provided a removable back member 5, which when in position for supporting the back, resembles very closely the conventional back construction. This back member extends above the seat member 1 the same distance as in the conventional construction and also a considerable distance below the top of the front seat and rests preferably, under normal conditions, on the floor 6ª of the automobile body at its lower end or edge. The length from top to bottom of the back member 5 is substantially equal to or slightly less than the span between the rear side or edge of the front seat and the front side or edge of the rear seat members. It will be here noted that if the span between the front and rear seat members is less than the normal distance of the height of the back member from the floor of the automobile body, the back member is correspondingly shortened and the lower edge or end thereof spaced from the floor of the automobile.

The back member 5 is constructed around a frame 7, perferably provided at the back side with a metal plate covering 8 and at the front side with a padding 9 and upholstering material 10 held outwardly from the frame 7 by means of a plurality of coil springs 11, as shown, the padding and upholstering material at the front side of the back member extending from the upper to the lower end thereof and from one side thereof to the other, thus covering the whole front side of the back member.

At the lateral ends of the frame 7 are provided hinge members 12, preferably extending in the same direction therewith and secured by means of bolts 15 to the normally upright members 7ª of the frame 7. At the outer sides of the hinge members 12 are preferably secured other upright frame members 7ᵇ, as shown best in Figs. 2 and 4. To the outer, normally upright frame members 7ᵇ are secured the ends of the metal back plate 8 which is preferably rounded at its ends which merge substantially with the upright portions of the body 6 at the lateral ends of the back member 5, as shown best in Fig. 4. The normally lower ends of the frame members 7ª and 7ᵇ are spaced apart forming a recess 7ᶜ into which extends, when said back member is in an upright position, the supporting and hinge member 13 of tubular construction and preferably rectangular in cross section, as shown best in Fig. 4. The upper ends of the tubular supporting and hinge members 13 are provided with pairs of spaced apart lugs 13ª through which extend pins 14, one for each supporting and hinge member. The normally lower ends of the hinge members 12 extend into the tubular portions of the members 13 and fit snugly therein for supporting the back member 5 rigidly when in an upright position. The portions of the hinge members 12 adapted to extend into the members 13 are longitudinally slotted, as indicated by 12ª in Fig. 1, for straddling the pins 14. The members 13 are secured to the floor 6ª of the automobile in any convenient manner. In case the back members are not of sufficient height to reach or rest on the floor, the same may be supported on the pins 14 by engagement with the normally upper ends of the slots in the hinge members 12.

Near the upper ends and back sides of the conventional back or back members of vehicle front seats are usually provided robe rails 16, which may be supported on arms 17 pivoted on brackets 18 secured to the back side of the back member, as shown in Fig. 1. At the outer ends of the arms 17 I have provided hook portions 19 which are normally protected and substantially concealed from plain vision when the robe rail is shifted downwardly, as shown by solid lines. When the robe rail is shifted to the dotted line position, however, the hook portions 19 extend a slight distance beyond the normally upper end of the back member and are adapted to engage the upper retaining ledges or portions 4ª of the back seat member support 4 when the back member is shifted downwardly to its extreme position, as shown by dotted lines in Fig. 1. When the back member 5 is shifted downwardly to the position stated, the top sides of the seat members 1 and 2 and the back member 5 are substantially flush, as shown in Fig. 1, providing a comfortable bed structure. When the back member is in the position last stated, the front end, or normally lower end thereof rests, by means of the hinge members 12, on the pins 14.

In order to fold the back member 5 downwardly, the same is simply raised until the lower ends of the hinge members 12 are withdrawn from the tubular portions of the hinge and supporting members 13 and then tilted backwardly until the same engages with the back seat members 2, when the back member is shifted forwardly in engagement with the front seat member 1.

It will be here noted that the back plate 8 of the back member 5 is provided near its lateral ends with slots 8ª which extend therein from its lower edge, as shown in Figs. 3 and 4, for receiving the rear portions of the supporting and hinge members 13 and for permitting the forward shifting of the back member 5 when folding the same downwardly, as stated.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a convertible automobile body structure, front and rear seat members, supports for said seat members, a pair of tubular back supporting and hinge members supported on the floor of the automobile behind said front seat member and extending upwardly from said floor, a back member positioned behind said front seat member with a portion thereof extending above and the other portion thereof extending below the same and positioned over said supporting and hinge members, and longitudinally slotted hinge members secured in the lower portions of and within said back member, said slotted hinge members being pivotally connected to the upper ends of said supporting and hinge members and extending into the tubular portions thereof when said back member is in a back supporting position, said back member being vertically slotted at the lower portion of its back wall behind the hinge members mounted therein, the slotted portions of said back member being adapted to receive the supporting and hinge members mounted on the floor when said back member is shifted to a vertical position.

2. In a convertible automobile body structure, upholstered front and rear seat members, supports for said seat members extending upwardly from the floor of the automobile, a pair of tubular back supporting and hinge members supported on the floor of the automobile behind said front seat member and extending upwardly from said floor, a back member wholly upholstered at its front side and positioned behind said front seat member with a portion thereof extending above said seat member and the other portion thereof extending below the same and positioned over said supporting and hinge members, and longitudinally slotted hinge members secured at the lower portions of and within said back member, pivotally connected at the upper ends of said supporting and hinge members and extending into the tubular portions thereof when said back member is in a back supporting position, said back member being vertically slotted at its lower portion behind the hinge members mounted therein adapted to receive the supporting and hinge members mounted on said floor when said back member is shifted to a vertical position, the upper upholstered side of said back member being substantially flush with the upper upholstered sides of said seat members when the former is shifted downwardly to a horizontal position between said seat members.

3. The combination with an automobile structure including front and rear seat members, of an adjustable backrest including a rectangular frame supporting an upholstered front portion, recesses extending lengthwise in the end members of said frame from the normal lower end thereof, elongated hinge members secured to said end members and positioned within said recesses, elongated slots formed in the lower end of said hinge members, and a pair of tubular hinge members secured to the floor of the automobile and adapted to receive said elongated hinge members, said tubular hinge members having pins at their upper end adapted to extend through the slots of said elongated hinge members, whereby said back rest may be supported rigidly in a substantially vertical position and lowered backwardly to a substantially horizontal position.

In testimony whereof, I have hereunto set my hand at Wayland, Missouri, this 5th day of May, 1925.

OLIVER E. HORNER.